Sept. 12, 1950   R. D. ENGLEHART   2,522,024
WEIGHT-HOLDING MEANS FOR WHEEL-BALANCING WEIGHTS
Filed Nov. 25, 1947

INVENTOR.
R. D. ENGLEHART
BY Merrill M. Blackburn.
Atty.

Patented Sept. 12, 1950

2,522,024

UNITED STATES PATENT OFFICE 2,522,024

WEIGHT-HOLDING MEANS FOR WHEEL-BALANCING WEIGHTS

Richard D. Englehart, Davenport, Iowa, assignor to Bee-Line Company, Scott County, Iowa, a copartnership Application November 25, 1947, Serial No. 788,066

3 Claims. (Cl. 301—5)

My present invention relates to a holding means for wheel-balancing weights which are to be attached to motor vehicle wheels, although it could conceivably be utilized with wheels other than those used on motor vehicles. Therefore, I do not wish any statement of use to be construed in a limiting sense.

Among the objects of this invention are the provision of an improved mode of attaching balancing weights to wheels; the provision of means for securely fastening balancing weights near the outer periphery of a wheel without having the weights project outwardly beyond the edge of the wheel rim; the provision of holding means for adjustably securing balance weights to a wheel to balance same, such securing means being an improvement over prior constructions used for this purpose; the provision of securing means for fastening balance weights to wheel rims in such a manner that they will not fly off from the rim during running of the vehicle; and such further objects, advantages, and capabilities as will hereafter appear and as are inherent in the construction disclosed. My invention further resides in the combination, construction, and arrangement of parts illustrated in the accompanying drawing and, while I have shown therein what is now regarded as the preferred embodiment of this invention and modifications thereof, I desire the same to be understood as illustrative only and not to be interpreted in a limiting sense.

In the drawings annexed hereto and forming a part hereof,

Reference will now be made in greater detail to the annexed drawings for a more complete description of this invention. In these drawings, the vehicle wheel rim 1 is shown as provided with a disc 2, in accordance with customary practice, and the rim is shown as provided with outwardly turned flanges 3. The parts 1 and 2 are already well known and constitute no part of my invention which may be embodied in any one of many forms, some of which are shown in the accompanying drawings.

Figures 1, 2:
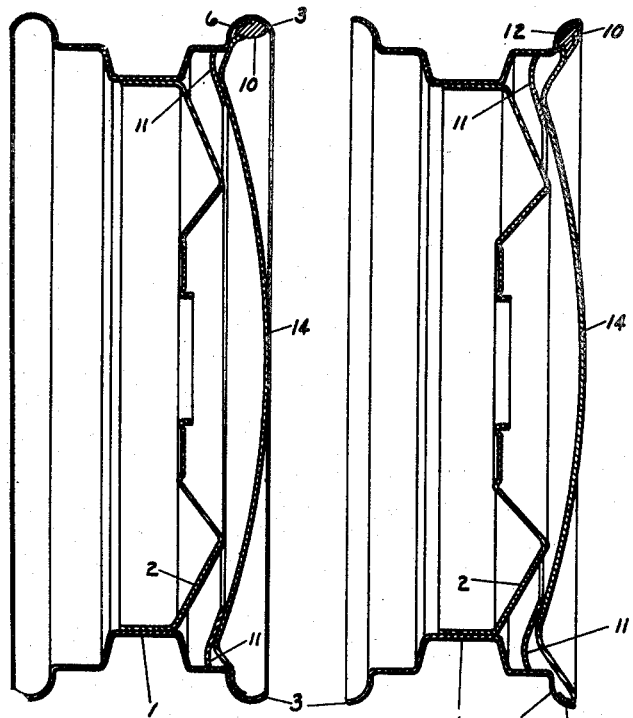
Fig. 1 is a view showing one form of weight-holding means.
Fig. 2 shows a modification of this invention.

In the structure shown in Fig. 1, there is provided a cover disc 14 having a flange 6 and spring fingers 11 which engage the shoulders 8 and hold the disc in place.

The structure of Fig. 2 is similar to that of Fig. 1 except that the flange 12 is turned in the opposite direction from the flange 6. Primarily this is intended for use with rims which, according to present practice, are provided with peripheral flanges which are not so deeply channeled as shown in Fig. 1.

Figure 3:
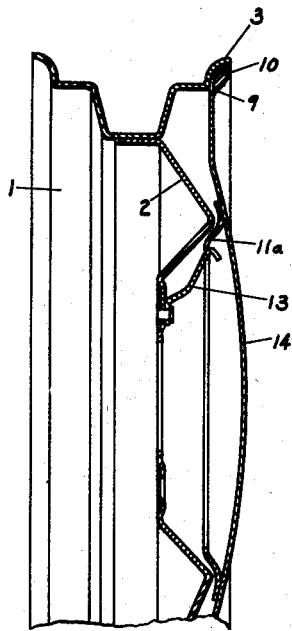
Fig. 3 shows a modification of the securing means of Fig. 2.

In the structure of Fig. 3, the wheel disc has fingers 13 attached near the center of the disc and these project outwardly in a roughly radial direction. On the inner face of the ornamental disc or member 14 is provided a ring 11a which engages the fingers 13 and holds the disc in place. The adjusting weight or weights is or are held in place in a manner similar to what is shown in Fig. 2.

It is of course understood that the specific description of structure set forth above may be departed from without departing from the spirit of this invention as disclosed herein and as defined in the appended claims.

Having now described my invention, I claim:

1. A wheel-balancing weight holder comprising an outwardly convexed disc having on its inner surface a ring which projects inwardly from the disc toward the axis of the wheel and is adapted to engage a part of the wheel to hold the disc attached thereto, said disc having around its periphery a concave flange adapted to fit in a correspondingly shaped channel in the edge portion of the rim of a wheel, the disc having means for engaging a balancing weight to hold it in place in the concave flange of the disc.

2. A wheel-balancing weight holder comprising an outwardly convexed disc having on its inner surface a ring which projects inwardly from the disc toward the axis of the wheel and is adapted to engage a part of the wheel to hold the disc attached thereto, said disc having around its periphery a concave flange adapted to fit in a correspondingly shaped channel in the edge portion of the rim of a wheel, the disc having means for engaging a balancing weight to hold it in place in the concave flange of the disc, said means comprising fingers extending from a peripheral portion of the disc into engagement with a balancing weight or weights to hold same in adjusted position.

3. A holding means for holding balancing weights attached to a wheel, said means comprising a disc provided upon its edge with a concave flange, the flange being formed into fingers to engage a balancing weight whereby to hold the weight attached to the rim, the disc being provided on its inner surface with a ring to engage the wheel and hold the disc and balancing weight to the wheel.

RICHARD D. ENGLEHART.

REFERENCES CITED

The following references are of record in the file of this patent:

UNITED STATES PATENTS

| Number    | Name  | Date          |
|-----------|-------|---------------|
| 2,280,637 | Kraft | Apr. 21, 1942 |
| 2,361,406 | Lyon  | Oct. 31, 1944 |